United States Patent
Trattler et al.

(10) Patent No.: US 10,101,819 B2
(45) Date of Patent: Oct. 16, 2018

(54) CONTROL SYSTEM FOR A GESTURE SENSING ARRANGEMENT AND METHOD FOR CONTROLLING A GESTURE SENSING ARRANGEMENT

(71) Applicant: AMS AG, Unterpremstätten (AT)

(72) Inventors: Peter Trattler, Graz (AT); Josef Kriebernegg, Graz (AT); Dan Jacobs, McKinney, TX (US); Christian Mautner, Fernitz (AT)

(73) Assignee: ams AG, Premstäetten (AT)

( * ) Notice: Subject to any disclaimer, the term of this patent is extended or adjusted under 35 U.S.C. 154(b) by 0 days.

(21) Appl. No.: 15/028,703

(22) PCT Filed: Oct. 8, 2014

(86) PCT No.: PCT/EP2014/071555
§ 371 (c)(1),
(2) Date: Apr. 11, 2016

(87) PCT Pub. No.: WO2015/052243
PCT Pub. Date: Apr. 16, 2015

(65) Prior Publication Data
US 2016/0239097 A1    Aug. 18, 2016

Related U.S. Application Data

(60) Provisional application No. 61/889,638, filed on Oct. 11, 2013.

(30) Foreign Application Priority Data

Dec. 18, 2013 (EP) ..................................... 13198091

(51) Int. Cl.
| | |
|---|---|
| G06F 3/01 | (2006.01) |
| G06F 1/32 | (2006.01) |
| G06F 3/042 | (2006.01) |
| G06F 3/03 | (2006.01) |

(52) U.S. Cl.
CPC .............. *G06F 3/017* (2013.01); *G06F 1/325* (2013.01); *G06F 1/3231* (2013.01);
(Continued)

(58) Field of Classification Search
CPC ...... G06F 1/3231; G06F 1/325; G06F 1/3259; G06F 1/3262; G06F 3/017; G06F 3/0304;
(Continued)

(56) References Cited

U.S. PATENT DOCUMENTS 8,937,601 B2 *  1/2015  In ........................... G06F 3/041
                                                    345/156
2006/0161870 A1 *  7/2006  Hotelling .............. G06F 3/0485
                                                    715/863
(Continued)

*Primary Examiner* — Stacy Khoo
(74) *Attorney, Agent, or Firm* — Fish & Richardson P.C.

(57) ABSTRACT

A control system for a gesture sensing arrangement with at least one sensor operates the sensor in a proximity mode. The control system receives data sets generated by the sensor and based on these data sets determines whether an object is present in a vicinity of the sensor. When an object is detected in the vicinity the control system operates the sensor in a gesture mode. Based on further data generated by the sensor the control system determines an end of a gesture, and operates the sensor in the proximity mode.

19 Claims, 3 Drawing Sheets

(52) U.S. Cl.
CPC .......... *G06F 1/3259* (2013.01); *G06F 1/3262* (2013.01); *G06F 3/0304* (2013.01); *G06F 3/0325* (2013.01); *G06F 3/042* (2013.01); *Y02D 10/155* (2018.01); *Y02D 10/173* (2018.01)

(58) Field of Classification Search
CPC ... G06F 3/0325; G06F 3/042; Y02B 60/1289; Y02B 60/1253
USPC ...................... 345/173–179; 178/18.01–18.09
See application file for complete search history.

(56) References Cited

U.S. PATENT DOCUMENTS

| | | | |
|---|---|---|---|
| 2008/0168290 A1* | 7/2008 | Jobs ........................... | G06F 1/26 713/324 |
| 2008/0316183 A1* | 12/2008 | Westerman ........... | G06F 3/0416 345/173 |
| 2009/0139778 A1* | 6/2009 | Butler ................... | G06F 1/1626 178/18.03 |
| 2011/0096032 A1* | 4/2011 | Nakanishi ............. | G06F 3/0428 345/175 |
| 2011/0310005 A1 | 12/2011 | Chen et al. | |
| 2012/0120247 A1 | 5/2012 | Kao et al. | |
| 2013/0191791 A1* | 7/2013 | Rydenhag ........... | G06F 3/04883 715/863 |
| 2013/0229508 A1 | 9/2013 | Li et al. | |
| 2014/0012528 A1* | 1/2014 | Carmel-Veilleux ..... | G01S 17/08 702/88 |
| 2016/0299635 A1* | 10/2016 | Glover ................... | G06F 3/017 |

* cited by examiner

CONTROL SYSTEM FOR A GESTURE SENSING ARRANGEMENT AND METHOD FOR CONTROLLING A GESTURE SENSING ARRANGEMENT

The present disclosure relates to a control system for a gesture sensing arrangement and to a method for controlling a gesture sensing arrangement.

BACKGROUND OF THE INVENTION

Gesture sensing or gesture recognition represents an alternative or additional way of controlling an electronic device, in particular a mobile electronic device such as, for example, a smartphone, a tablet computer or an eBook reading device. Rather than using a keyboard or a mouse or touching individual points on a touchscreen, gesture detection allows to use specific defined movements by the user's finger or hand to interact with an electronic device in a convenient way. A possibile realization is to use touchless gesture sensing, using optical sensors and a corresponding evaluation arrangement. This technology involves for example driving infrared emitters and evaluating of the signals generated by photodetectors, which detect light reflected by an object. A drawback is a resulting considerable power consumption and a consequent lowering of the battery lifetime of the electronic device.

SUMMARY OF THE INVENTION

A gesture sensing arrangement in view of the present disclosure comprises at least one optical sensor that is designed to send and detect light, where herein and hereafter "light" generally denotes electromagnetic radiation, preferably infrared radiation.

In order to detect a gesture, a corresponding object that performs the gesture, for example a hand or a finger of a user, is required to be located within a certain vicinity of the sensor. Therefore a control system for a gesture sensing arrangement according to the present disclosure is designed to serve for at least two different tasks.

The first task is a proximity detection, i.e. determination whether an object, for example the hand of a user, has entered a vicinity of the sensor. The location of the object, in particular its distance from the sensor, is encoded in light that is sent out by the sensor, reflected by the object and thereupon detected by the sensor. For example the closer the object is to the sensor, the higher is the intensity of the reflected and detected light. By means of comparison of the resulting sensor signals for example to threshold values corresponding to maximum distances, the entering of the object into the vicinity, defined by the threshold values, of the sensor is determined.

The second task is the actual gesture detection, identifying how the object, for example the user's hand, is moving in the vicinity of the sensor. In order to determine the position and/or the motion of an object, it is again made use of the light sent out by a sensor, being reflected by the object and detected by the sensor.

It should be mentioned, that the same sensor, in particular the same light-sending elements and the same photodetectors, may be employed to perform both, the proximity detection and the gesture detection.

According to an embodiment, a control system for a gesture sensing arrangement starts operating the sensor in a proximity mode. While the sensor is operated in the proximity mode, the control system continuously receives data sets from the sensor and, based on these data sets, determines whether an object has entered a certain vicinity close to the sensor. When an object is determined to be within the vicinity, the operation mode is changed from the proximity mode to a gesture mode.

The control system is designed receive one or more data sets from the sensor while the sensor is operated in the gesture mode and further to determine an end of a gesture based on the received data sets. When the end of a gesture has been determined, the control system operates the sensor in the proximity mode, respectively switches back to the proximity mode. Afterwards, the procedure can start again by detecting an object in the vicinity of the sensor.

The end of a gesture may, for example, correspond to the sensor repeatedly generating signals with values below a defined threshold. That may indicate that the object has been outside of the vicinity of the sensor for a defined time period. Alternatively other detectable patterns in the motion of the object can be defined as an end of a gesture.

The requirements of the proximity mode and the gesture mode concerning the characteristics of the sent out light and the settings for light detection can differ. The light sent out by the sensor can, for example, be arranged in consecutive bursts of light pulses. Parameters that characterize the sensor operation are, for example
  a number of pulses within one burst
  a time period between consecutive bursts
  a pulse width
  an intensity of individual pulses, controlled by a driving current of the sensor
  gain factors
  detection thresholds For example, for detecting gestures, the time periods between bursts of pulses commonly may be shorter or the number of pulses per burst commonly may be higher than for determination of the proximity of an object. Typical numbers of light pulses per burst may lie between 1 and 64. Typical values for the gain factors may lie between 1 and 8. Typical values for pulse widths may lie between 4 µs and 32 µs. Typical time periods between bursts of pulses may lie in the order of milliseconds for the gesture mode and in the order of several tens of milliseconds for the proximity mode. Consequently, the power consumption may be significantly higher while operating in the gesture mode compared to the power consumption while operating in the proximity mode, and therefore switching between the proximity mode and the gesture mode as described above leads to a reduced power consumption.

In various embodiments the control system further comprises a buffer element, for example implemented as a first-in first-out memory. The control system is designed to write data sets received from the sensor while operating in the gesture mode to the buffer element. The data sets here can, for example, correspond to parts of a gesture or the data sets can correspond to a full gesture. The control system then determines whether the data written to the buffer element fulfils one or more previously defined conditions of gesture validity. When the data fulfil the conditions of gesture validity, the control system sends a signal, particularly a wakeup signal to a processor. The wakeup signal may for example correspond to an interrupt request, IRQ. Thereupon the processor can collect data from the buffer element.

The processor can be, for example, part of an electronic device which is operated by the gesture sensing arrangement, for example a tablet computer or smartphone, or it can also be a part of the gesture sensing arrangement. It is also possible to separate the tasks of the processor, so that one part of the processor is contained in the gesture sensing arrangement and another part is contained in the electronic device.

In an embodiment of a control system for a gesture sensing arrangement, a minimum length of a gesture is used as a condition of gesture validity. The minimum length can correspond to a minimum number of data sets written to the buffer element with values greater than a defined threshold value.

In another embodiment a maximum distance of the object from the sensor is used as a condition for gesture validity. A distance of the object below the maximum distance can correspond to a data set written to the buffer element with a value greater than a defined threshold value.

Of course it is possible to define other conditions as conditions for gesture validity, for example a motion of the object in a defined direction to be larger than a threshold distance.

According to some implementations, the control system may ignore and/or delete data from the buffer element, in particular not send a wakeup signal to the processor, if not all conditions of gesture validity are fulfilled.

Making use of the described embodiments with the control system comprising a buffer element, the power consumption of a gesture sensing arrangement can be reduced and consequently the battery lifetime of an attached electronic device can be increased, since the processor has to be turned on only when the control system has sent the corresponding wakeup signal.

Another implication of making use of the buffer element is that the gesture sensing arrangement can be used with devices featuring a high latency device driver. The time delay between consecutive bursts of light pulses can be very short, for example in the order of milliseconds. Therefore the processor has to be able to receive and process new data sets every few milliseconds, if no buffer element is implemented in the control system. Using a buffer element, on the other hand, allows for device drivers that cannot fulfil this requirement. As explained above, the conditions of gesture validity may be adjusted to the individual requirements of the electronic device. In particular the conditions can be tuned to optimize the rate of interrupts of the processor, while the performance of the gesture sensing arrangement remains high.

In some embodiments the control system comprises the sensor, which may be implemented as a directional light sensor array. For example, the sensor comprises at least one light-emitting or light-sending element, for example a light-emitting diode, and at least two directional photodetectors, which are implemented to detect light mainly from a predominant direction. The predominant direction may be specified individually for each photodetector. Using directional photodetectors with different predominant directions has the advantage that the sensor can provide signals corresponding to light incident from different directions onto the sensor.

In additional embodiments of the control system, utilizing the sensor implemented as a directional light-sensor array, the sensor comprises one light emitting or light-sending element. Further the sensor comprises a first photodetector for detecting light incident from a left, a second photodetector for detecting light incident from a right, a third photodetector for detecting light incident from an above and a fourth photodetector for detecting light incident from a below direction. The directions left, right, above and below are commonly defined with respect to a principle plane and an orientation of the electronic device, for which the gesture sensing arrangement is used.

In some implementations, one or more photodetectors can be switched off while the sensor is operated in the proximity mode. By this it can, for example, be avoided that the control system unnecessarily switches from the proximity mode to the gesture mode due to an erroneously detected proximity of an object. Considering a smartphone, for example, the sensor may be mounted above a touchscreen used to operate the smartphone. Then, the hand of the user might come close to the sensor, without the user intending to perform a gesture. In this case an unnecessary entry to the gesture mode can be avoided by deactivating the fourth photodetector during operation in proximity mode. Since the power consumption is commonly higher in the gesture mode than in the proximity mode, this also results in a reduction of power consumption.

In further embodiments, one or more photodetectors may be switched off while the sensor is operating in the gesture mode. This may be done for example for cases, where a subset of gestures may be sufficient. Considering, for example, the reading of a virtual book on a tablet computer, it might be sufficient to use gestures at which the user's hand or finger is moved from left to right or vice versa. Therefore in this case the sensors for detecting light incident from the above and the below directions may be switched off.

On the other hand, it might be sufficient to only provide the possibility to use gestures including motions from above to below or vice versa. Scrolling through a document on a smartphone would be an example for this. In this case the photodetectors for detecting light incident from the left and right directions may be switched off. Again, these measures result in a reduction of the power consumption. The control of switching individual photodetectors may be performed or partly performed by a processor, in particular the processor may select which of the photodetectors to be switched on and off and provide information regarding the timing of the switching.

In some embodiments the control system is designed to receive signals from the sensor corresponding to the individual photodetectors, or to groups of the photodetectors, one after another. In this case switching off one or more photodetectors when operating in the gesture mode can also improve the speed of the gesture sensing.

In other embodiments the gesture sensing arrangement can comprise a further sensor, for example a sensor for ambient light sensing. Ambient light sensing means the evaluation of the brightness of the surrounding environment of the electronic device or the further sensor, respectively, in order to adjust specific settings of the electronic device, for example the brightness of the display illumination.

In some implementations, the control system is designed to deactivate a further sensor while the sensor is operating in the gesture mode, and to activate the further sensor while the sensor is operating in the proximity mode. Thereby unwanted actions of the electronic device are prevented, that may be triggered by an object shadowing the further sensor when a gesture is performed by the user. Additionally the control system can be designed to also restrict measurements from the further sensor to the time periods between the bursts of the sensor, meaning that measurements from the further sensor are only performed when there is no light emitted by the sensor. In this way unwanted interaction of the light sent out by the sensor with the further sensor, for example the ambient light sensor, can be avoided.

In other embodiments, the control system comprises the further sensor, which is designed not to detect light being sent out by the sensor, while the sensor is designed not to detect light that might be sent out by the further sensor. In particular the further sensor may be designed to send and detect visible light but no infrared radiation, while the sensor may be designed to send and detect infrared radiation but not visible light. For example, this may be achieved by using individual optical filters with different transmission characteristics.

In various embodiments the light sent out by the sensor consists of bursts of individual light pulses, in particular consecutive bursts of light pulses with equal delay times between the bursts. Preferably the light pulses within one burst of pulses have the same pulse period and are equally spaced. Then, when comparing the proximity mode to the gesture mode, the proximity mode exhibits for example one or more of the following:
- a different, for example a lower, number of pulses within one burst,
- a different pulse width,
- a different, for example a longer, time delay between two consecutive bursts of pulses,
- a higher driving current of the sensor, in particular of a light-emitting element of the sensor,
- a different gain factor of the sensor, in particular of a photodetector of the sensor, and
- a different detection threshold, for example a different minimum and/or maximum distance of an object In this way it is possible to optimize for example the proximity mode for low power consumption and the gesture mode for high reliability and/or high performance of the gesture detection.

In further embodiments of a control system for a gesture sensing arrangement, the photodetectors of the sensor are supplied with individual offset currents. In particular the values of the offset currents may be related to the number of pulses. This measure is, for example, suitable to compensate for erroneously generated sensor signals due to light that is detected by the photodetectors, but has not been reflected by an object before. This type of erroneous sensor signals are referred to as optical crosstalk and can be generated for example due to reflection of light from the housing of the sensor or the electronic device or the glass on top of the sensor. Commonly, this effect may be higher for example for a directional photodetector, designed for detecting light incident from a direction where a light-sending element is located, compared to directional photodetectors with other predominant directions.

In some embodiments the control system is configured to perform a self-calibration of the individual offset currents for each photodetector. In such embodiment, the processor does not have to perform this calibration, implying an additional reduction of the power consumption.

According to an embodiment of a method for controlling a gesture sensing arrangement with at least one sensor which is designed to send and detect light and to generate data sets from the detected light, the sensor is initially operated in a proximity mode. In accordance with the above description for a control system for a gesture sensing arrangement, it is then determined whether an object is present in a predetermined vicinity of the sensor by evaluating data sets generated by the sensor while operating in the proximity mode. After detection of an object, the sensor is operated in a gesture mode generating further data sets. Based on the further data sets an end of a gesture is determined. Thereupon the sensor is operated in the proximity mode or switched back to the proximity mode, respectively.

Further embodiments of the method become apparent from the various embodiments described for the control system.

In the following the invention is explained in detail using exemplary embodiments with reference to the drawings. Components that are functionally identical or have an identical effect bear identical references. The description of components that correspond to one or another function will not be repeated in each of the following figures.

DETAILED DESCRIPTION

Figure 1:
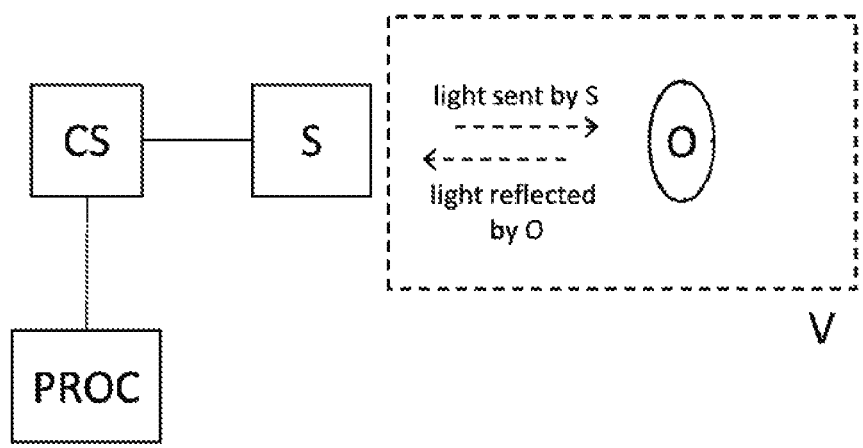
FIG. 1 shows an embodiment of a control system within a gesture sensing arrangement.

FIG. 1 shows an exemplary embodiment of a control system CS within a gesture sensing arrangement with a sensor S and a processor PROC. The processor PROC is for example part of an electronic device, that is operated by the gesture sensing arrangement. The control system CS is coupled to the processor PROC and the sensor S. An object O, which may represent for example a hand or a finger of a user of the electronic device, is depicted in a predefined vicinity V of the sensor S.

The control system CS is designed to operate the sensor S in different operation modes, for example a proximity mode PROX or a gesture mode GEST. Operated in the proximity mode PROX, the sensor S for example sends out light, preferably infrared light, which is reflected by the object O and in turn detected by the sensor S. The detected light carries for example information about the position of the object O, in particular about the distance between the object O and the sensor S. The control system CS evaluates for example the data received from the sensor S and determines whether the object O is located within the vicinity V of the sensor S. When the location of the object O is determined to lie within the vicinity V, the control system operates the sensor for example in the gesture mode GEST. From the data which the control system CS receives from the sensor S while operated in the gesture mode GEST, the control system CS determines for example an end of a gesture, and when the end of a gesture is determined, the control system CS operates the sensor S in the proximity mode PROX, or switches back to the proximity mode, respectively.

Figure 2:
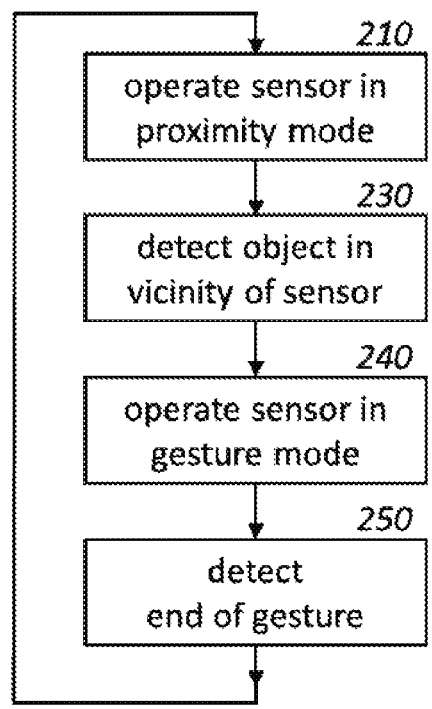
FIG. 2 shows an example of a process flow of a method for controlling a gesture sensing arrangement.

FIG. 2 shows an example of a process flow according to a method for controlling a gesture sensing arrangement. The method may for example be implemented in a control system CS as described before and hereafter. A sensor S is operated in a proximity mode PROX (block 210). Data are continuously received from the sensor S while operated in the proximity mode PROX. Based on the received data it is determined whether an object O is present in a vicinity V of the sensor S. Once an object O is detected in the vicinity V of the sensor S (block 230), the sensor S is operated in a gesture mode GEST (block 240). When the end of a gesture is detected (block 250) based on further data received from the sensor S, the sensor S is again operated in the proximity mode PROX, or switched back to the proximity mode PROX, respectively (block 210).

Figure 3A:
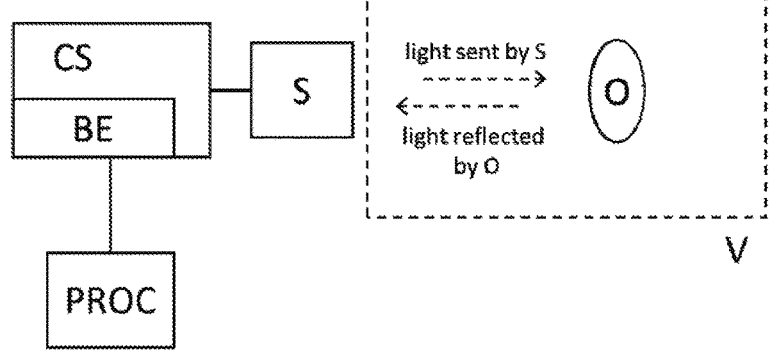
FIG. 3A shows a further embodiment of a control system within a gesture sensing arrangement.

FIG. 3A shows an embodiment of a control system CS within a gesture sensing arrangement that is based on the embodiment shown in FIG. 1, but the control system CS further comprises a buffer element BE. Preferably the buffer element BE is implemented as a first-in first-out memory.

In this embodiment the control system CS is designed to write for example data sets received from the sensor S to the buffer element BE, when the sensor S is operated in the gesture mode GEST. Furthermore, the control system CS may be designed to test the stored data upon fulfilling predetermined conditions of gesture validity. A condition of gesture validity may be, for example, a certain number of data sets that reflect the object being present in the vicinity V, that is the condition of gesture validity corresponds to a minimum length of a gesture. Another possibility for a condition of gesture validity is a certain minimum amplitude of a signal generated by the sensor S, corresponding to a maximum distance between the object O and the sensor S. When all required conditions for gesture validity are fulfilled, the control system CS for example sends a signal to the processor PROC. Preferably the sent signal corresponds to a wakeup signal for the processor PROC which ends a possible passive state of the processor PROC. For example, the control system CS may be designed to ignore, in particular delete, the data sets written to the buffer element BE, in particular not to send a wakeup signal to the processor PROC, if not all conditions of gesture validity are fulfilled.

Figure 3B:
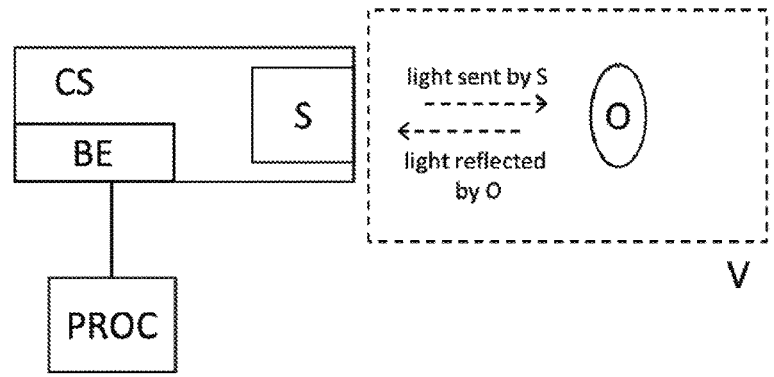
FIG. 3B shows a further embodiment of a control system within a gesture sensing arrangement.

FIG. 3B shows an embodiment of a control system CS within a gesture sensing arrangement based on the previous embodiments as shown in FIG. 3A and FIG. 1, respectively, but further comprising the sensor S. The sensor S may for example be implemented as a directional light sensor array. In this case, the sensor S comprises at least one light-sending element and at least two photodetectors, implemented to detect light incident from a predominant direction specified for each photodetector individually.

Figure 4:
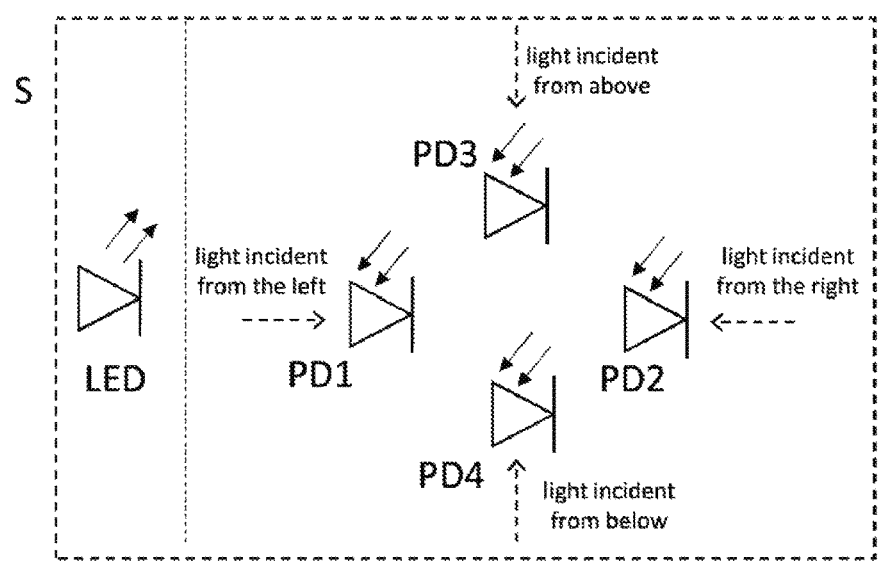
FIG. 4 shows a block diagram of a sensor implemented in a control system for a gesture sensing arrangement.

FIG. 4 shows an example of a directional light sensor array comprising one light-sending element LED and four photodetectors, namely a first photodetector PD1, a second photodetector PD2, a third photodetector PD3 and a fourth photodetector PD4. The first, second, third and fourth photodetectors are designed as directional photodetectors, meaning that they generate directional sensor signals, which each can be assigned to a predominant direction from which light has entered the sensor. Such directional sensor array can be used as the sensor S in any of the embodiments described above or hereafter.

For example, the first photodetector PD1 is designed to generate a sensor signal corresponding to light incident from the left, the second photodetector PD2 is designed to generate a sensor signal corresponding to light incident from the right, the third photodetector PD3 is designed to generate a sensor signal corresponding to light incident from above and the fourth photodetector PD4 is designed to generate a sensor signal corresponding to light incident from below. The directions left, right, above and below are related to a plane and an orientation, preferably to a principal plane of an electronic device and an orientation of the electronic device. It should be noted, that the physical location of of the photodetectors PD1, PD2, PD3, PD4 is not necessarily related to the direction of incidence of the light that is detected by the photodetector. For example in FIG. 4, the first detector PD1 is placed on the left side of the sensor layout and also is designed to generate a sensor signal corresponding to light incident from the left. However, it could as well be designed to generate a sensor signal corresponding to light incident from the right or another direction, while still being placed on the left side of the layout. The same holds for all photodetectors PD1, PD2, PD3, PD4.

The restriction to the four directions mentioned in the previous paragraph is in no way mandatory, in particular also more than four directional photodetectors may be used. On the other hand, in some embodiments of a control system CS utilizing the sensor S, it can be sufficient that the sensor comprises only two directional photodetectors, for example the first photodetector PD1 and the second photodetector PD2 or the third photodetector PD3 and the fourth photodetector PD4. In such cases, only gestures comprising motions in the corresponding directions, for example from the left to the right or vice versa or from above to below or vice versa can be detected. Such gestures may for example indicate the turning of pages when reading a virtual book on an electronic device.

In further embodiments, one or more photodetectors of the sensor S can be switched off while the sensor S is operated in the proximity mode PROX. For example, the fourth photodetector PD4 can be deactivated when the sensor S is operated in the proximity mode PROX, so that the object O is not determined by the sensor S when entering the vicinity V of the sensor S from the below direction. This can be beneficial in preventing the control system CS from unintentionally operating the sensor S in the gesture mode GEST, for example when the user of the electronic device erroneously enters the vicinity V with his hand while operating the touchscreen of the device.

In other embodiments one or more photodetectors of the sensor S can be switched off while a sensor is operated in the gesture mode GEST. As explained above, this restricts the detectable gestures to gestures including motions in certain directions. By this means, for example a reduction of power consumtion can be achieved.

Figure 5:
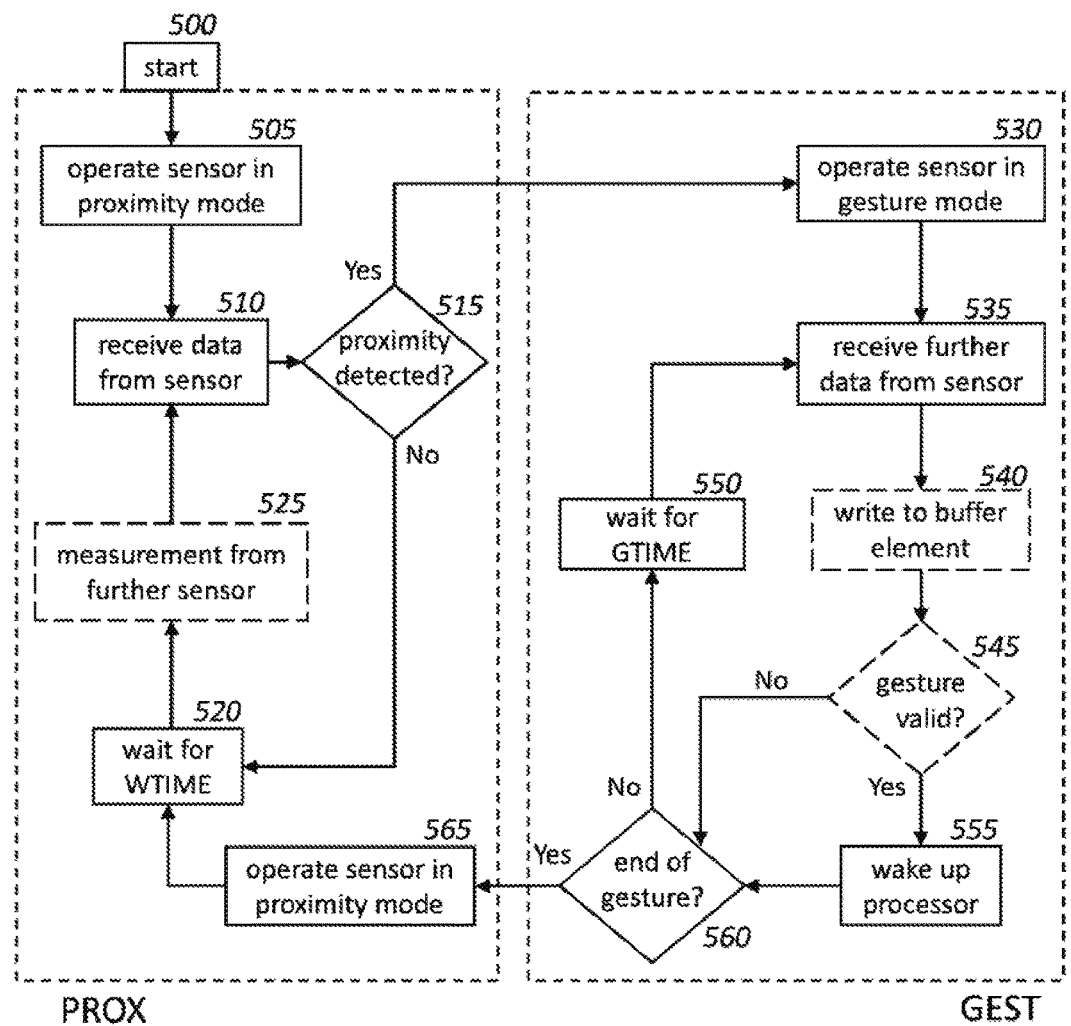
FIG. 5 shows a further example of a process flow of a method for controlling a gesture sensing arrangement.

FIG. 5 shows another example of a process flow of an embodiment of a method for controlling a gesture sensing arrangement, based on the exemplary process flow of FIG. 2. The method may for example be implemented in a control system CS as described before.

The process flow starts with block 500. In block 505 (corresponding to block 210 in FIG. 2), the sensor S initially is operated in a proximity mode PROX. Then in block 510 (corresponding to block 220) data generated by the sensor S while operated in the proximity mode are received, and in block 515 (corresponding to block 230) it is determined whether an object O is present in a vicinity V of the sensor S. If this is not the case, it is waited for a first delay time WTIME, as shown in block 520. The first delay time WTIME can, for example, be synchronized with a time delay between bursts of light pulses sent by the sensor S. Then, according to block 525, a measurement from a further sensor may be performed, for example an ambient light measurement. Preferably the ambient light measurement, which is an optional step in the process flow, is performed during time periods where no light is sent out by the sensor S. Afterwards, the process flow has again reached block 510, receiving data from the sensor S. If an object O is determined to be present in the vicinity V of the sensor S, the sensor S is operated in a gesture mode GEST according to block 530 (corresponding to block 240).

After receiving further data from the sensor S in block 535, the further data are written to a buffer element BE in block 540. Based on the further data, it is determined in block 545 whether required predefined conditions of gesture validity are fulfilled. If this is not the case, it is determined in block 560 whether an end of a gesture is reflected in the further data. If all required conditions of gesture validity are fulfilled in block 545, a wakeup signal is sent to a processor PROC in block 555. The processor PROC is for example attached to the gesture sensing arrangement. The wakeup signal triggers the processor PROC for example to collect the data from the buffer element BE. The steps of blocks 540 and 545 are optional.

If the end of a gesture is not detected in block 560, the process flow is continued with block 550, where it is waited for a second delay time GTIME and the process flow is continued again with blocks 535-545, receiving further data from the sensor S that is written to the buffer element BE. If the end of a gesture is detected in block 560, the sensor S is operated in the proximity mode PROX in block 565 and the loop is closed by continuing with block 520.

It should be noted here, that in case of a negative result of the determination regarding gesture validity in block 545 an end of a gesture could anyway be detected subsequently in block 560. Consider for example a number of sensor signals with amplitudes above a certain minimum value as condition for gesture validity, and another number of sensor signals with amplitudes below a certain maximum value as condition for the end of a gesture.

In the embodiment of the method described above, the wakeup signal is sent to the processor PROC (block 555) whenever further data are received from the senor S (block 535) or, respectively, whenever the required conditions of gesture validity are fulfilled (block 545). However, the wakeup signal could also be sent at other positions of the process flow. In some embodiments, the wakeup signal may be sent for example whenever the sensor S is operated in the gesture mode GEST (block 530) or whenever the end of a gesture has been detected (block 560). In further embodiments, sending the wakeup signal may also be unnecessary and therefore omitted.

The different methods and their implementation in control systems for gesture sensing arrangements represent suitable means for reducing the power consumption of electronic devices. Some embodiments may also lead to more a speedy or a more accurate gesture recognition. The power consumption may be reduced even more, for example by making use of techniques like reduction of an overall clock frequency for example during waiting times corresponding for example to blocks 520 and/or 550 in FIG. 5. While in some embodiments an external sensor S and/or processor PROC is controlled by a control system CS, the latter can also comprise or partly comprise the sensor S and/or the processor PROC. For example the control system CS, and/or the sensor S, may be implemented as an integrated circuit on a microchip. Furthermore, the various embodiments can be combined or split to be adapted to specific applications.

The invention claimed is:

1. A control system for a gesture sensing arrangement with comprising:
a sensor designed to send and detect light and to generate data sets from the detected light,
wherein the control system is designed to:
operate the sensor in a proximity mode;
determine a presence of an object in a predetermined vicinity of the sensor from a data set generated by the sensor while operating in the proximity mode;
when the presence of the object has been determined, operate the sensor in a gesture mode, wherein the power consumption of the sensor is lower in the proximity mode than in the gesture mode;
determine an end of a gesture, based on one or more data sets received from the sensor while operating in the gesture mode; and
when the end of a gesture is determined operate the sensor in the proximity mode, and
wherein the sensor is implemented as a directional light sensor array comprising:
at least one light-sending element; and
at least two photodetectors, implemented to detect light incident from a predominant direction specified for each photodetector individually, and
wherein the control system and the directional sensor array are implemented as an integrated circuit on a microchip.

2. The control system according to claim 1, further comprising a buffer element, the control system designed to:
write data sets received from the sensor to the buffer element when the sensor is operated in gesture mode; and
send a signal, in particular a wakeup signal, to a processor when one or more predetermined conditions of gesture validity are fulfilled.

3. The control system according to claim 2, wherein the buffer element is implemented as a first-in first-out memory.

4. The control system according to claim 2, further designed to ignore the data sets written to the buffer element, in particular not to send a wakeup signal to the processor, if not all conditions of gesture validity are fulfilled.

5. The control system according to claim 2, wherein one condition of gesture validity represents a minimum length of a gesture.

6. The control system according to claim 2, wherein one condition of gesture validity represents a maximum distance between the object and the sensor.

7. The control system according to claim 1, wherein the directional light sensor array further comprises:
a first photodetector, designed to detect light incident from the left with respect to a specified coordinate system;
a second photodetector, designed to detect light incident from the right with respect to the coordinate system;
a third photodetector, designed to detect light incident from above with respect to the coordinate system; and
a fourth photodetector, designed to detect light incident from below with respect to the coordinate system.

8. The control system according to claim 1, designed to switch off one or more of the photodetectors of the sensor while the sensor is operated in the proximity mode and/or the gesture mode, where the switched off photodetectors need not be the same in the proximity mode and the gesture mode.

9. The control system according to claim 1, designed to:
deactivate a further sensor while the sensor is operated in the gesture mode;
activate the further sensor while the sensor is operated in the proximity mode; and
restrict measurements based on signals generated by the further sensor to time periods, where the sensor is not sending light.

10. The control system according to claim 1, wherein the light sent by the sensor comprises bursts of light pulses, and wherein operating the sensor in the proximity mode as compared to the gesture mode includes at least one of the following: a lower number of pulses in a burst, a different pulse width, a longer time delay between consecutive bursts, a higher driving current, a different gain factor, or a different detection threshold.

11. A method for controlling a gesture sensing arrangement with at least one sensor, the sensor designed to send and detect light and to generate data sets from the detected light, wherein the method comprises:
    operating the sensor in a proximity mode;
    determining a presence of an object in a predetermined vicinity of the sensor based on a data set generated by the sensor while operating in the proximity mode;
    operating the sensor in a gesture mode when the presence of the object has been determined, wherein the power consumption of the sensor is lower in the proximity mode than in the gesture mode;
    determining an end of a gesture, based on one or more data sets received from the sensor while operating in the gesture mode; and
    operating the sensor in the proximity mode when the end of a gesture is determined,
    wherein the sensor is implemented as a directional light sensor array comprising:
        at least one light-sending element; and
        at least two photodetectors, implemented to detect light incident from a predominant direction specified for each photodetector individually, and
    wherein the control system and the directional sensor array are implemented as an integrated circuit on a microchip.

12. The method according to claim 11, further comprising:
    writing data sets generated by the sensor to a buffer element when the sensor is operated in the gesture mode; and
    sending a signal, in particular a wakeup signal, to a processor when one or more predetermined conditions of gesture validity are fulfilled.

13. The method according to claim 12, further comprising ignoring the data sets written to the buffer element, by not sending a wakeup signal to the processor, if not all conditions of gesture validity are fulfilled.

14. The method according to claim 12, wherein one condition of gesture validity represents a minimum length of a gesture.

15. The method according to claim 12, wherein one condition of gesture validity represents a maximum distance between the object and the sensor.

16. The method according to claim 11, further comprising:
    deactivating a further sensor while the sensor is operated in the gesture mode;
    activating the further sensor while the sensor is operated in the proximity mode; and
    restricting measurements based on signals generated by the further sensor to time periods, where the sensor is not sending light.

17. The method according to claim 11, further comprising switching off one or more of the photodetectors of the sensor while the sensor is operated in the proximity mode and/or the gesture mode, where the switched off photodetectors need not be the same in the proximity mode and the gesture mode.

18. The method according to claim 11, wherein the light sent by the sensor comprises bursts of light pulses, and
    wherein operating the sensor in the proximity mode as compared to the gesture mode includes at least one of the following: a lower number of pulses in a burst, a different pulse width, a longer time delay between consecutive bursts, a higher driving current, a different gain factor, or a different detection threshold.

19. A control system for a gesture sensing arrangement with at least one sensor, the control system designed to:
    operate the sensor in a proximity mode;
    when the presence of an object has been determined during the proximity mode, operate the sensor in a gesture mode, wherein the power consumption of the sensor is lower in the proximity mode than in the gesture mode; and
    when an end of a gesture is determined during the gesture mode, operate the sensor in the proximity mode,
    wherein the sensor is implemented as a directional light sensor array comprising:
        at least one light-sending element; and
        at least two photodetectors, implemented to detect light incident from a predominant direction specified for each photodetector individually, and
    wherein the control system and the directional sensor array are implemented as an integrated circuit on a microchip.

* * * * *